United States Patent
Rapp et al.

(10) Patent No.: US 8,432,398 B2
(45) Date of Patent: Apr. 30, 2013

(54) CHARACTERISTIC DETERMINATION FOR AN OUTPUT NODE

(75) Inventors: John Rapp, Seattle, WA (US); Andrew Bliss, Kirkland, WA (US); Shai Hinitz, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 797 days.

(21) Appl. No.: 12/613,371

(22) Filed: Nov. 5, 2009

(65) Prior Publication Data

US 2011/0102441 A1    May 5, 2011

(51) Int. Cl.
*G06T 11/20*    (2006.01)

(52) U.S. Cl.
USPC ........... 345/440; 345/581; 345/619; 717/104; 717/105; 717/114; 717/124; 717/125; 717/127; 717/131; 717/144

(58) Field of Classification Search .................. None
See application file for complete search history.

(56) References Cited

U.S. PATENT DOCUMENTS

| | | | |
|---|---|---|---|
| 5,929,864 A | 7/1999 | Picott | |
| 6,756,994 B1 * | 6/2004 | Tlaskal | 345/648 |
| 7,750,909 B2 * | 7/2010 | Purang et al. | 345/440 |
| 7,945,892 B1 * | 5/2011 | Kainz et al. | 717/105 |

OTHER PUBLICATIONS

BSGP: Bulk-Synchronous GPU Programming—Published Date: 2008 http://www.multicoreinfo.com/research/papers/2008/sig-graph08-BSGP.pdf.
The Direct3D 10 System—Published Date: 2006 http://download.microsoft.com/download/f/2/d/f2d5ee2c-b7ba-4cd0-9686-b6508b5479a1/direct3d10_web.pdf.
The Lightspeed Automatic Interactive Lighting Preview System—Published Date: May 2007 http://people.csail.mit.edu/jrk/lightspeed/lightspeed_thesis.pdf.
MSA-CUDA: Multiple Sequence Alignment on Graphics Processing Units with CUDA—Published Date: 2009 https://agora.cs.illinois.edu/download/attachments/26546776/msaCuda.pdf.
GPU based Visual Computing—Retrieved Date: Oct. 16, 2009 http://www.cse.iitb.ac.in/graphics/~anand/website/reports/1st_stg_Report.pdf.

* cited by examiner

*Primary Examiner* — Antonio A Caschera
(74) *Attorney, Agent, or Firm* — Shook Hardy & Bacon LLP

(57) ABSTRACT

Systems, methods, and computer storage media having computer-executable instructions embodied thereon determine whether an output value of a dependency graph has a particular characteristic. In one embodiment, to make this determination, a dependency graph is generated that illustrates external and internal nodes, in addition to their dependency to one another. External nodes, or those nodes that do not depend on other nodes, are analyzed to determine whether they have a particular characteristic. Depending on the operation associated with the characteristic, it may then be determined whether the output value of the dependency graph also has that characteristic.

20 Claims, 6 Drawing Sheets

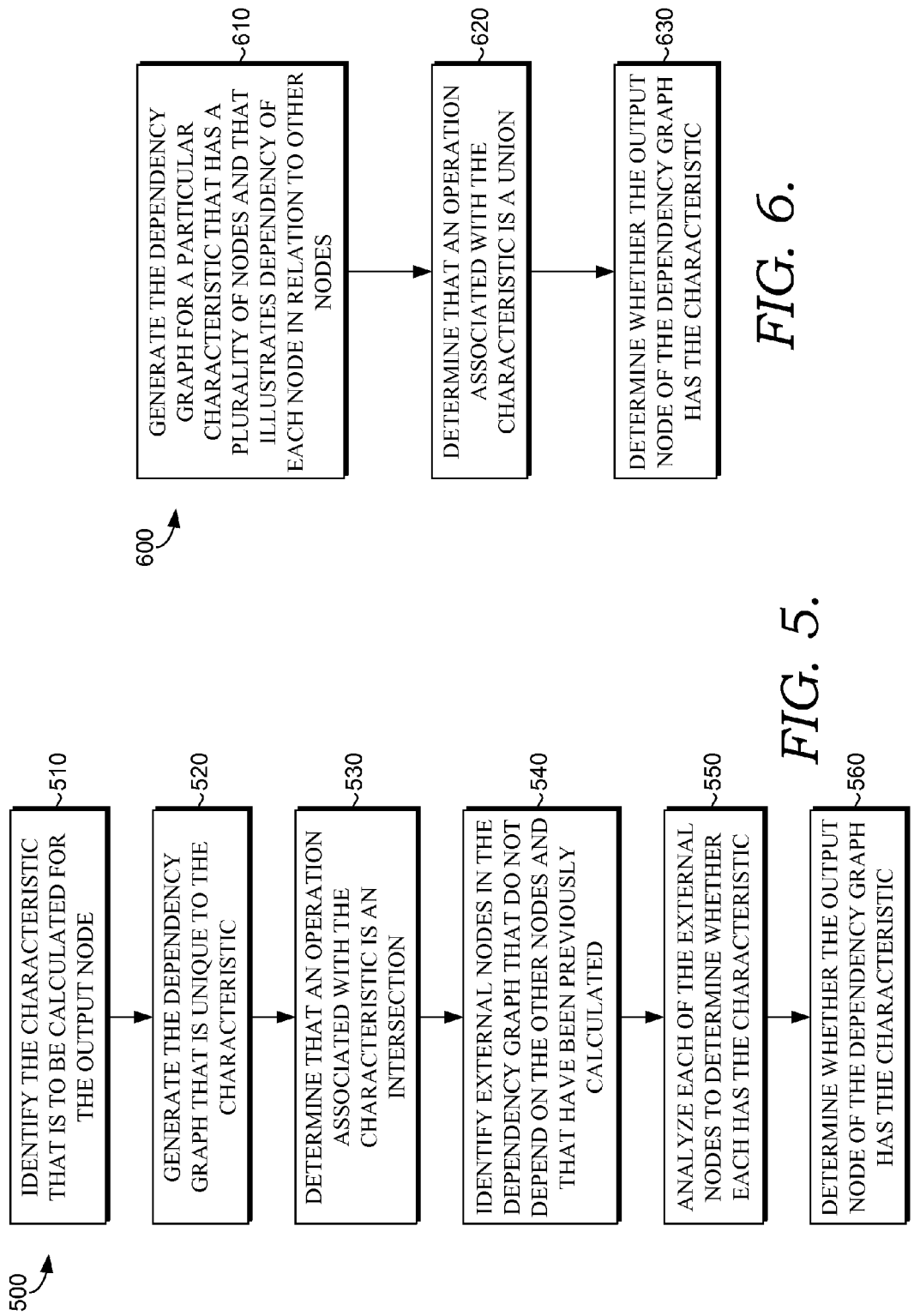

ers have been authored in machine code. More recently, however, shaders have been written in higher-level languages, and then compiled into machine code by compilers. The compiled shaders are then executed on graphic acceleration hardware to display the desired result. The complexity of these shader programs have continued to increase as the demands for more compelling and realistic graphics have also increased. Further, the recent introduction of general computing on graphics hardware has increased the complexity of these devices even more. Shader programs typically have requirements that restrict the types of calculations that can be executed in different scenarios. These restrictions are due, in part, to the complexity of shader programs running potentially thousands of threads of execution simultaneously, compounded by the necessity for the programs to optimally run on various types of hardware. Other restrictions are due to the way graphics hardware is set up, such that it is built to enable thousands of threads to run efficiently, which dictates restrictions on how programs access memory and how much threads can vary from each other. Some of these restrictions include operations that cannot execute in varying flow-control or on data that may be varying, or operations that cannot be executed on data coming from certain types of resources.

CHARACTERISTIC DETERMINATION FOR AN OUTPUT NODE

BACKGROUND

Traditionally, shaders, such as software programs that extend functionality of graphics acceleration hardware, have been authored in machine code. More recently, however, shaders have been written in higher-level languages, and then compiled into machine code by compilers. The compiled shaders are then executed on graphic acceleration hardware to display the desired result. The complexity of these shader programs have continued to increase as the demands for more compelling and realistic graphics have also increased. Further, the recent introduction of general computing on graphics hardware has increased the complexity of these devices even more. Shader programs typically have requirements that restrict the types of calculations that can be executed in different scenarios. These restrictions are due, in part, to the complexity of shader programs running potentially thousands of threads of execution simultaneously, compounded by the necessity for the programs to optimally run on various types of hardware. Other restrictions are due to the way graphics hardware is set up, such that it is built to enable thousands of threads to run efficiently, which dictates restrictions on how programs access memory and how much threads can vary from each other. Some of these restrictions include operations that cannot execute in varying flow-control or on data that may be varying, or operations that cannot be executed on data coming from certain types of resources.

Compilers require knowledge about the values involved in the compilation in order to perform optimizations, such as bits that are known to be a certain value, ranges that a value can have, and whether a value may be a special nonmathematical value, such as not a number or infinity. Previously, in order to calculate this information in code that contains loops or circular dependencies, a compiler would start with a conservative guess and would simulate execution of a loop until it converged on an acceptable answer. This, however, resulted in the compiler being too conservative, resulting in less optimization, in addition to a significant amount of time being required to execute the task. Further, there have traditionally been separate, but overlapping systems for each type of information being calculated, which expends unnecessary time and resources, including execution time of the compiler.

SUMMARY

Embodiments of the present invention relate to systems, methods, and computer-readable media for, among other things, determining whether an output value has a particular characteristic, such as uniformity, whether a node is always initialized, integral float, whether the node is from an Unordered Access View (UAV), whether it is possible that it is not a number, whether it is possible that it is infinity, and ranges/partial data. This may be determined, in one embodiment, by generating a dependency graph of all the contributing elements to an output value (e.g., of all nodes that contribute to the output node), identifying the external nodes, or those that do not depend on any other nodes, and analyzing only those nodes to determine whether they have that particular characteristic. Internal nodes, or those that depend on other nodes, may be completely ignored. Depending on a merging operation associated with the characteristic, such as union or intersection, it may be determined whether the output value has that particular characteristic.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 5 is a flow diagram showing a method for determining whether an output node in a dependency graph has a particular characteristic based on characteristics of one or more input nodes, in accordance with an embodiment of the present invention;

FIG. 6 is a flow diagram showing a method for determining whether an output node in a dependency graph has a particular characteristic based on characteristics of one or more input nodes, in accordance with another embodiment of the present invention.

DETAILED DESCRIPTION

Figure 1:
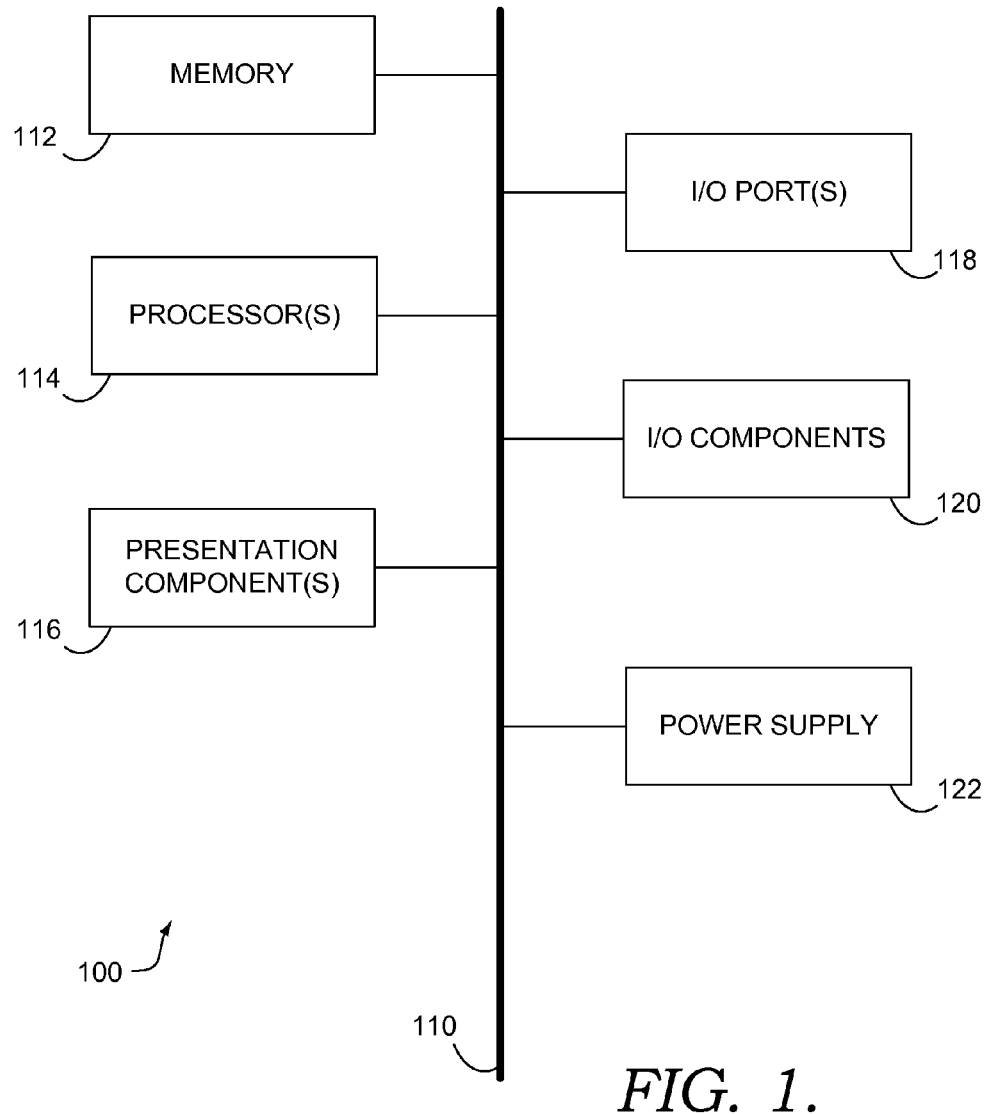
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to systems, methods, and computer storage media having computer-executable instructions embodied thereon that allow for a compiler to determine which portions of code, such as code for a computer graphics program, can be parallelized, wherein multiple instances of a program may be run simultaneously. Another key issue in addition to parallelism is knowing whether an output node may be uninitialized. To make the determination as to which portions of code can be parallelized, various nodes in a dependency graph are analyzed to determine whether they have various characteristics. These characteristics aid in making the determination as to whether a portion of a code can be safely run in a parallel execution environment. In one embodiment, only the external nodes, or those that do not depend on other nodes, are analyzed for these characteristics. The internal nodes are ignored. Depending on an operation associated with a particular characteristic, it can be determined whether the output value also has that characteristic. For instance, if the operation is intersection, all of the internal nodes of a dependency graph must have that particular characteristic in order for the output node to also have that characteristic.

Accordingly, in one aspect, the present invention is directed to one or more computer storage media having computer-executable instructions embodied thereon, that when executed, cause a computing device to perform a method for determining whether an output node in a dependency graph has a particular characteristic based on characteristics of one or more input nodes. The method identifies the characteristic that is to be calculated for the output node and generates the dependency graph that is unique to the characteristic. The dependency graph has a plurality of nodes and illustrates dependency of each node in relation to other nodes. Further, the nodes represent one or more of a value, a condition, or a tree structure. The method also includes determining that an operation associated with the characteristic is an intersection, identifying external nodes in the dependency graph that do not depend on the other nodes and that have been previously calculated, and analyzing each of the external nodes to determine whether each has the characteristic. It is also determined whether the output node of the dependency graph has the characteristic. The output node has the characteristic only if all of the external nodes in the dependency graph also have the characteristic.

In another aspect, the present invention is directed to one or more computer storage media having computer-executable instructions embodied thereon, that when executed, cause a computing device to perform a method for determining whether an output node in a dependency graph has a particular characteristic based on characteristics of one or more input nodes. The method includes generating the dependency graph for a particular characteristic that has a plurality of nodes and that illustrates dependency of each node in relation to other nodes to determine whether the output node has the characteristic. The nodes represent one or more of a value, a condition, or a tree structure. It is determined that an operation associated with the characteristic is a union. Further, it is also determined whether the output node of the dependency graph has the characteristic. This may include identifying external nodes in the dependency graph that do not depend on the other nodes, and analyzing each of the external nodes to determine whether each has the characteristic. The output node has the characteristic if one or more of the external nodes in the dependency graph have the characteristic.

In yet another aspect, the present invention is directed to one or more computer storage media having computer-executable instructions embodied thereon that, when executed, cause a computing device to perform a method for determining whether an output node in a dependency graph has a particular characteristic based on characteristics of one or more input nodes. The method includes generating a normal dependency graph that represents code corresponding to a computer graphics program. The normal dependency graph comprises a plurality of nodes, which are identified as internal nodes or external nodes. At least one of the nodes represents one or more of a shared value or a value stored in a readable/writable buffer. Based on the normal dependency graph, a characteristic-specific dependency graph is generated that is used to determine whether the output node has a particular characteristic. Further, the method includes identifying which of the plurality of nodes are the internal nodes by determining which of the plurality of nodes depend strictly on other values. Each of the external nodes, which have not been determined to depend strictly on the other values, is analyzed to determine whether they have the characteristic. The external nodes have been previously calculated. A merging operation associated with the characteristic is determined, such that the merging operation is a union or an intersection. Further, all data in the external nodes is merged to determine whether the output node has the characteristic. If the merging operation is a union operation, then the output node has the characteristic if one or more of the external nodes have the characteristic. But, if the merging operation is an intersection operation, then the output node has the characteristic only if all of the external nodes have the characteristic.

Having briefly described an overview of the present invention, an exemplary operating environment in which various aspects of the present invention may be implemented is described below in order to provide a general context for various aspects of the present invention. Referring to the drawings in general, and initially to FIG. 1 in particular, an exemplary operating system suitable for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including handheld devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation component 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices; or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation module(s) 116 present data indications to a user or other device. Exemplary presentation modules include a display device, speaker, printing module, vibrating module, and the like. I/O ports 118 allow computing device 100 to be logically coupled to other devices including I/O components 120, some of which may be built in. Illustrative modules include a microphone, joystick, game pad, satellite dish, scanner, printer, wireless device, and the like.

Figure 2:
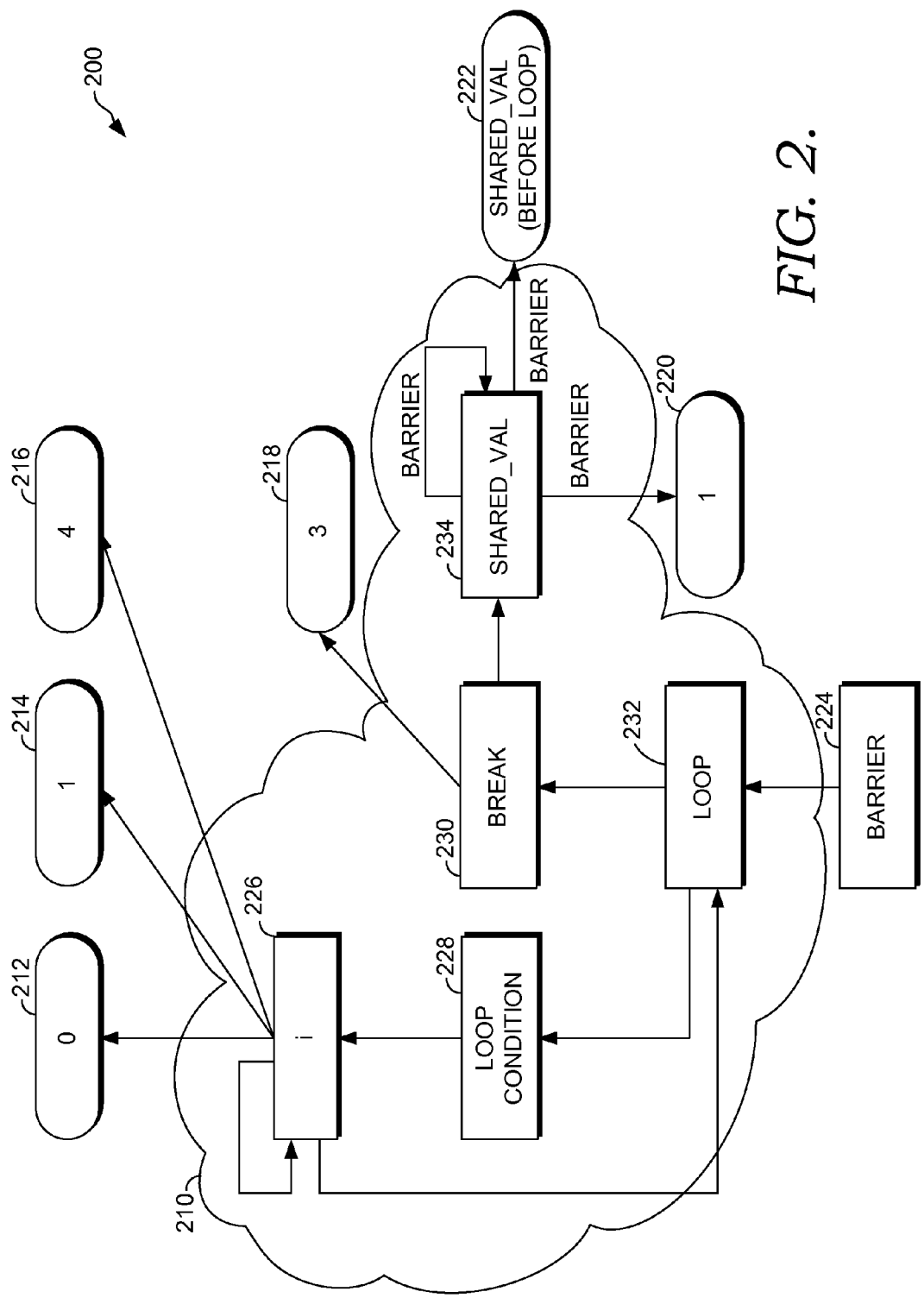
FIGS. 2-4 are characteristic-specific dependency graphs, in accordance with various embodiments of the present invention.

Turning now to FIG. 2, a characteristic-specific dependency graph 200 is illustrated, in accordance with an embodiment of the present invention. A dependency graph, as used herein, is a directed graph representing dependencies of several objects toward each other, as represented by the arrows and nodes in FIG. 2. The dependency graph shown in FIG. 2 includes a plurality of nodes, which may be external nodes or internal nodes. Generally, external nodes are those that have previously been calculated, and don't depend on other nodes. In one instance, external nodes may also be referred to as leaf nodes. Further, an external node generally has no child nodes, as it does not depend on any other nodes, and is farthest from a root node. Internal nodes, on the other hand, are those nodes that are inside a loop in the case of looping flow control, since any value inside the loop may affect other values. Internal nodes may also be referred to as nonleaf nodes, in one instance.

The code that is represented by the dependency graph in FIG. 2 is as follows:

```
for ( int i = 0; i < 4; i++ )
{
  Barrier ( );
  If (shared_val > 3)
    Break;
  Barrier ( );
  Buffer.Append (local_val++);
  InterlockedAdd (shared_val, 1);
}
```

Item 210 generally refers to nodes, and specifically internal nodes, that are inside of a loop. The internal nodes include internal nodes 226, 228, 230, 232, and 234. A loop, as referred to herein, is a series of commands represented in a dependency graph that will continue to repeat over and over again until a condition is met. External nodes 212, 214, 216, 218, 220, and 222 are shown as being connected to various internal nodes by way of arrows from the internal nodes extending to an external node. This relationship is one of dependency, such that the internal nodes depend on one or more external nodes. By way of example, internal node 226 depends on external nodes 212, 214, and 216, as well as internal node 226 (e.g., it depends on itself) and internal node 232. As a further example, internal node 234 depends on both external nodes 220 and 222, as well as internal 234 (e.g., depends on itself) and internal node 232.

In one embodiment, one or more external nodes may be constant values, and thus do not vary. In the embodiment of FIG. 2, examples of constant nodes include external nodes 212, 214, 216, 218, and 220. Additionally, one or more external nodes may vary, such as a value that is shared between different instances of a program, a value that is used in different portions of a program, or a value that is stored in a buffer, such as a read/write buffer. Any of these values listed may be modified, and thus may affect the output of a calculation, which, in the embodiment of FIG. 2, is output node 224.

In accordance with an embodiment of the present invention, it may be determined whether an output value, such as the value represented by output node 224, possesses certain characteristics by analyzing the characteristics of other nodes in the dependency graph. For instance, in one embodiment, all external nodes are analyzed for a particular characteristic, and depending on an operation associated with that characteristic, it can be determined whether or not the output node also has that characteristic. For example, some exemplary characteristics include uniform, always initialized, and integral float, and each of these characteristics is associated with an intersection operation. As used herein, an intersection operation requires that all external nodes possess the characteristic in order for the output node to also possess that characteristic. As previously mentioned, the internal nodes can safely be ignored when determining whether the output node possesses a certain characteristic. As such, referring to FIG. 2, if each of external nodes 212, 214, 216, 218, 220, and 222 are all uniform values, then it can safely be assumed that the output node 224 will also be a uniform value.

There are also many characteristics that are associated with a union operation, including, but certainly not limited to, where the value is derived from an Unordered Access View (UAV), where it is possible that the value is not a number, where it is possible that the value is infinity, or where there are ranges/partial data. Ranges may represent known intervals for values, and partial data may represent bits that are known to be set or unset for values. UAV is a read-write resource and a value read from it may or may not be consistent or valid across all executing threads due to threads changing the value at different times.

In some instances, a synchronization mechanism, such as a barrier, may be used for a particular node, and specifically a node that represents a shared value. A synchronization mechanism generally blocks other portions of a program from using that shared variable until the portion using it at that time has finished using it. As such, a barrier ensures that all threads see consistent state for the shared value. For instance, the value is "checked out" until the program is through using that value, wherein it is then "checked in" so that other instances of the program or other portions of the program may use that value. In essence, synchronization mechanism forces other parts of the program to wait to use that shared variable. In FIG. 2, internal node 234 is surrounded by a barrier, such that internal node 234 is in effect insulated.

Normally, this shared variable would infect the output node 224, meaning that if the shared value is ever modified, it would also change the output. When there is a barrier, however, there are no worries that the output may become infected, as the shared value would not change with a surrounding barrier. Further, in one embodiment, the external nodes associated with the node that has the barrier, which here would be external nodes 220 and 222, can be ignored when determining certain characteristics of the output node 224, such as the uniform characteristic, as the read for the break statement occurred directly after a barrier operation. If another characteristic were being determined, however, one or more of the external nodes 220 and 222 may be analyzed to determine their respective characteristics. Further, the InterlockedAdd in the loop is incrementing shared_val (internal node 234) such that various threads, or nodes, perform that operation at different times. Here, if there was no barrier or synchronization mechanism prior to the "if (shared_val>3)" in the code, different threads would arrive at the "if( )" at different times and shared_val (internal node 234) could have different values. Therefore, the barrier forces all threads to sync up at that point, guaranteeing that no thread is still waiting to increment shared_val (internal node 234). Similarly, the barrier after the "if( )" means that no thread can run forward and increment shared_val (internal node 234) before all threads have had a chance to execute the "if( )."

Figure 3:
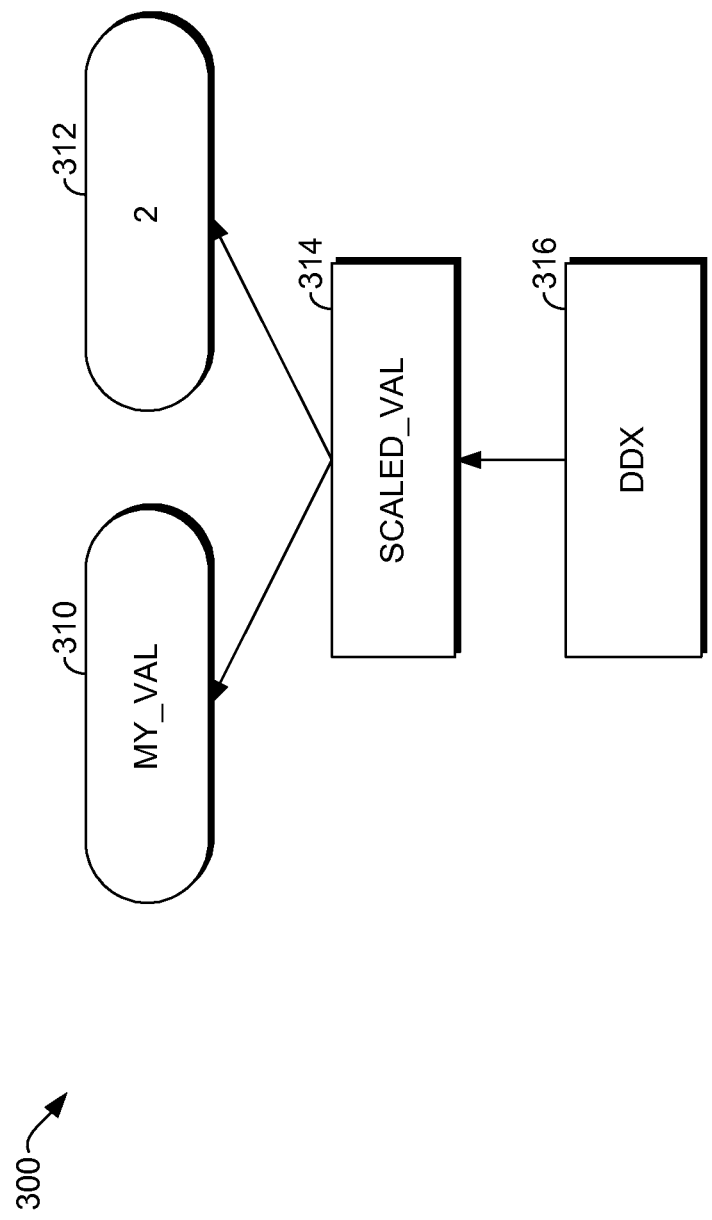

Referring to FIG. 3, a characteristic-specific dependency graph 300 is illustrated, in accordance with an embodiment of the present invention. The code that is represented by the dependency graph in FIG. 3 is as follows:

my_val=RWBuffer (my_index);
scaled_val=2*my_val;
diff=ddx(my_val);

Generally, the embodiment of FIG. 3 illustrates how a value that is saved in a read/write buffer affects the output value, or output node. Here, external nodes are external nodes 310 and 312, and the internal node is internal node 314. Output node 316 depends on internal node 314, and internal node 314 depends on both external nodes 310 and 312. As shown in the code above, external node 310 is a value that is stored in a read/write buffer. The problem here is that the currently running program or another instance of the program may change this value while the program is running, and as such, will infect the output of this calculation. More specifically, external node 310 is the result of a UAV operation, or an Unordered Access View, which is essentially writable memory. The value of the output node 316 may then be marked as being invalid. UAV accesses in the pixel shader are undefined when running on "inactive" pixels, and the DDX operation would attempt to read the data in those inactive pixels, which would result in an undefined value. This is a problem addressed by the solution presented herein.

Thus, to determine whether the output node 316 possesses the UAV characteristic, the two external nodes 310 and 312 are analyzed to determine whether they possess the UAV characteristic, while the internal node 314 is ignored, as it is not an external node. As mentioned, external node 310 is the result of a UAV operation, while external node 312 is not. It is a constant. The operation associated with the UAV characteristic is union, which means that if even one of the external nodes has that characteristic, then it can be safely assumed that the output node also has that characteristic. Here, since external node 310 is the result of a UAV operation, and since the operation associated with UAV is union, the output node 316 also possesses that characteristic, or UAV.

Figure 4:
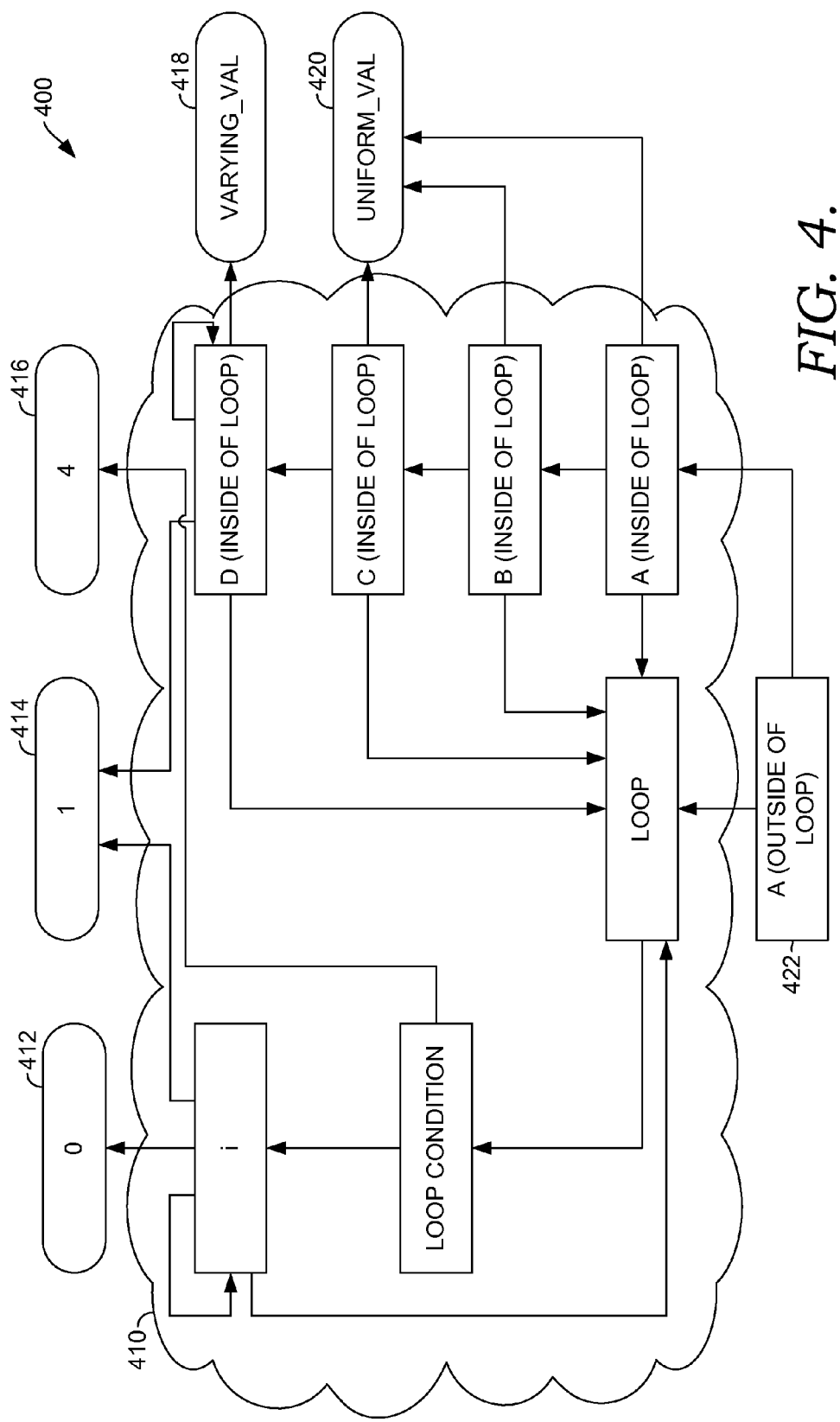

FIG. 4 is a characteristic-specific dependency graph 400, in accordance with an embodiment of the present invention. The code that is represented by the dependency graph of FIG. 4 is as follows:

```
int a = uniform_val;
int b = uniform_val;
int c = uniform_val;
int d = varying_val;
for (int i = 0; i < 4; i++)
{
    a = b;
    b = c;
    c = d;
    d++;
}
USE (a)
```

The nodes inside of item 410 are internal nodes, as they are considered to be inside of the loop. External nodes include items 412, 414, 416, 418, and 420. External node 418 may be varying, such that the value that it references may be different for different processes running concurrently. External node 410 may be uniform, (e.g., non-varying), and thus the value that it references will always be the same when accessed for each process running concurrently. External nodes 412, 414, and 416 are constants, or literal integers, and therefore cannot be changed by other processes. Traditionally, previous techniques would propagate the data one iteration of the loop at a time in order to determine whether any of the external nodes would infect the output node, such that if external node 418, for example, was capable of being different in other processes, that would affect d(inside of loop), which would affect c(inside of loop), which would affect b(inside of loop), which would affect a(inside the loop), and which would ultimately affect the output node, or a(outside of loop). This is a simple example of how many iterations would have to be performed to make that determination. More complex code may require many more iterations than what is required in the embodiment of FIG. 4.

Utilizing an embodiment of the present invention, however, the external nodes can be analyzed to determine whether they possess a particular characteristic, and from there, it can be determined whether the output node also possesses that characteristic. It is important to note that internal nodes are ignored and are not analyzed to determine whether they possess a certain characteristic. Here, external nodes 412, 414, 416, 418, and 420 may be analyzed to determine whether each has a particular characteristic. Exemplary characteristics include uniformity, whether a node is always initialized, integral float, whether the node is from a UAV, whether it is possible that it is not a number, whether it is possible that it is infinity, and ranges/partial data. Ranges represent known intervals for values, and partial data represents bits that are known to be set or unset for values. Each characteristic is associated with an operation, which tells the program how to determine a particular characteristic associated with the output node.

For instance, uniformity, whether a node is always initialized, and integral float are associated with an intersection operation, meaning that all external nodes are required to have that characteristic in order for the output node, such as output node 422, to also have it. The other characteristics, such as whether the node is from a UAV, whether it is possible that it is not a number, whether it is possible that it is infinity, and ranges/partial data are associated with a union operation, meaning that only one (e.g., one or more) of the external nodes is required to have that characteristic for the output node to also have it. Once this data that has been analyzed has been merged, it can be determined whether or not the output node has that characteristic.

FIG. 5 illustrates a method 500 for determining whether an output node in a dependency graph has a particular characteristic based on characteristics of one or more input nodes, in accordance with an embodiment of the present invention. Initially, at step 510, a characteristic that is to be calculated for the output node is identified. As mentioned above, exemplary characteristics include, but are certainly not limited to, uniformity, whether a node is always initialized, integral float, whether the node is from a UAV, whether it is possible that it is not a number, whether it is possible that it is infinity, and ranges/partial data. Ranges represent known intervals for values, and partial data represents bits that are known to be set or unset for values.

At step 520, a dependency graph is generated that is unique to the characteristic identified at step 510. The dependency graph has a plurality of nodes, which represent, for example, a value, a condition, or a separate tree structure from what is shown in the dependency graph. Generally, a dependency graph illustrates dependency information for each node in relation to other nodes by way of arrows that point from a node to one or more other nodes from which the node depends. This is illustrated in FIGS. 2-4 herein. In one embodiment, the dependency graph is generated during the compilation of code that is used for a pixel shader program by the High Level Shading Language (HLSL) compiler. Any program, however, other than the pixel shader or other graphics programs may use embodiments of the present invention. Others programs include those associated with the DX pipeline stage, including Vertex, Hull, Domain, Geometry or Compute. Further, the present invention is not limited to these programs, and may be used with any single instruction, multiple data (SIMD) parallel system.

At step 530, an operation associated with the identified characteristic is determined to be an intersection operation. As stated above, an intersection operation requires that all external nodes in the dependency graph have that characteristic in order for the output node, such as output node 422 in FIG. 4, to also have it. At step 540, external nodes are identified in the dependency graph. External nodes are nodes that do not depend on other nodes and that may have been previously calculated or determined. Internal nodes, on the other hand, do depend on one or more other nodes, and may result from looping flow control. These nodes are ignored while determining whether the output node of the dependency graph has a particular characteristic. Internal nodes are ignored because they may have cyclic connections, and propagation of characteristics may not be able to be resolved in one pass through the graph. Instead, the graph may have to be iteratively processes until it reaches stability. As such, not only can processing of internals be skipped, but also an arbitrary number of processing steps can be skipped, thus turning a loosely-bounded process into a fixed-time process.

External nodes, in some embodiments, are variable, but in other embodiments, are uniform. A variable node may be, for example, a shared node or shared value that is used by multiple instances of a program and may be located in different portions of the code. Shared values are capable of being modified, and thus may create problems when there are multiple instances of a program simultaneously running. Other variable nodes may be stored in a read/write buffer and may be capable of being modified. This may also present problems.

Each of the identified external nodes are then analyzed at step 550 to determine whether each node has the identified characteristic. At step 560, it is determined whether the output node of the dependency graph also has the identified characteristic, wherein the output node has the characteristic only if all of the external nodes in the dependency graph also have the characteristic. As mentioned above, an intersection operation requires all external nodes to have the characteristic in order for the output node to also have it. If all of the external nodes do not have the characteristic, it can be assumed that the output node does not have it. Once it is determined whether the output node has various characteristics, it can then be determined whether the program represented by the dependency graph can be parallelized, or simultaneously run on multiple computing devices. As previously described, synchronization operations, such as a barrier operation, may be present in a dependency graph and may alter which external nodes need to be analyzed for the characteristic. This is described above, and shown in FIG. 2.

Referring to FIG. 6, another method 600 for determining whether an output node in a dependency graph has a particular characteristic based on characteristics of one or more input nodes is shown, in accordance with an embodiment of the present invention. Initially, a dependency graph for a particular characteristic is generated at step 610. The dependency graph has a plurality of nodes, and illustrates dependency of each node in relation to other nodes. The dependency graph is used to determine whether an output node has a particular characteristic. Generally, nodes represent a value, a condition, or a tree structure.

At step 620, it is determined that an operation associated with the characteristic is a union. For the output node to have a characteristic that is associated with a union operation, it is required that only one or more of the external nodes also have that characteristic. It is determined at step 630 whether the output node of the dependency graph has the characteristic. This includes identifying any external nodes in the dependency graph that do not depend on the other nodes, and analyzing each of the external nodes to determine whether each has the characteristic, wherein the output node has the characteristic if one or more of the external nodes in the dependency graph have the characteristic. As described, all internal nodes can be safely ignored that do not affect the characteristic.

Figure 7:
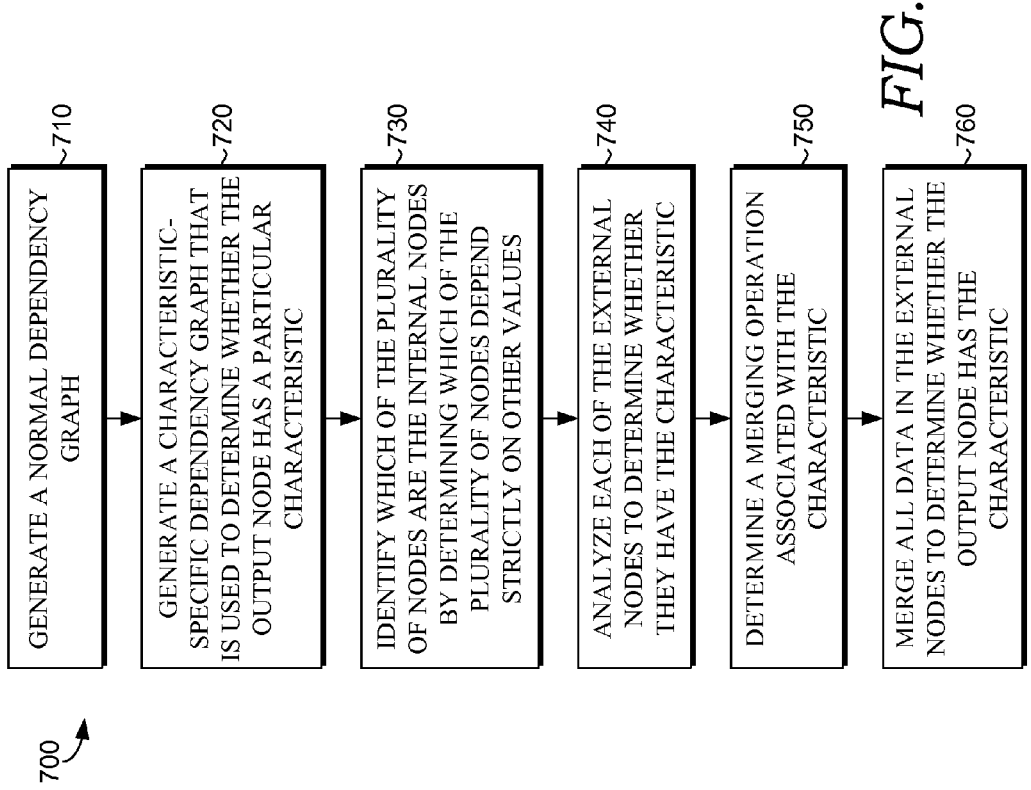
FIG. 7 is a flow diagram showing a method for determining whether an output node in a dependency graph has a particular characteristic based on characteristics of one or more input nodes, in accordance with another embodiment of the present invention.

Turning now to FIG. 7, another method 700 is shown for determining whether an output node in a dependency graph has a particular characteristic based on characteristics of one or more input nodes, in accordance with an embodiment of the present invention. At step 710, a normal dependency graph is generated that represents code corresponding to a computer graphics program. The nodes may be identified as internal nodes or external nodes. Further, at least one of the nodes may represent a shared value or a value stored in a readable/writable buffer. Marking which values were written by which operations may be performed, and in the case of indexed memory, which values may be sources of indexed reads later in the program may also be marked. In the normal dependency graph, edges in the graph are marked that have gone through a synchronization primitive (e.g., barrier operation) for later use in calculating whether those values are varying or not.

At step 720, a characteristic-specific dependency graph is generated and is used to determine whether the output node has a particular characteristic. In one embodiment, for each value written, and in the order it was written in the program, this characteristic graph may be calculated for each characteristic that is of interest. It is identified at step 730 which of the nodes are internal nodes by determining which of the nodes depend strictly on other values. Generally, internal nodes are ignored such that they are not analyzed to determine whether they possess a particular characteristic. Once identified, it can easily be determined which nodes are external nodes, as external nodes do not depend on other nodes or values. Each of the external nodes are analyzed at step 740 to determine whether each has the characteristic. External nodes are values with known characteristics. At step 750, a merging operation is determined, the merging operation being associated with the characteristic. The merging operation may be a union in one embodiment, or an intersection in another embodiment. Further, all data in the external nodes is merged at step 760 to determine whether the output node has the characteristic. If the merging operation is a union operation, then the output node has the characteristic if one or more of the external nodes have the characteristic, but if the merging operation is an intersection operation, then the output node has the characteristic only if all of the external nodes have the characteristic.

In generating the characteristic-specific dependency graph, a list of arguments are received that may affect a value, such as index data, surrounding flow-control, and potential sources of indexed reads. Specific characteristics have their own special cases in this portion of the compiler, such as operations reading from a UAV will have the UAV flag added automatically, so inputs to the operation may not be looked at. Generally, a characteristic-specific dependency graph is a subgraph of a normal dependency graph, and it tends to turn interior nodes in the dependency graph into leaf nodes. For example, a UAV operation implies that its result has the UAV characteristic, wherein the normal dependency graph would contain any addresses and other sources for the operation. In another example, barriers stop traversals of shared memory or UAV reads in the uniform-specific dependency graph.

It will be understood by those of ordinary skill in the art that the order of steps shown in the method 500 of FIG. 5, the method 600 of FIG. 6, and the method 700 of FIG. 7 are not meant to limit the scope of the present invention in any way and, in fact, the steps may occur in a variety of different sequences within embodiments hereof. Any and all such variations, and any combinations thereof, are contemplated to be within the scope of embodiments of the present invention.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more tangible computer storage media having computer-executable instructions embodied thereon, that when executed, cause a computing device to perform a method for determining whether an output node in a dependency graph has a characteristic based on a plurality of characteristics of one or more input nodes, the method comprising:
identifying the characteristic from the plurality of characteristics that is to be calculated for the output node;
generating the dependency graph that is unique to the characteristic, wherein the dependency graph has a plurality of nodes and illustrates dependency of each node in relation to other nodes, and wherein the nodes represent one or more of a value, a condition, or a tree structure;
determining that an operation associated with the characteristic is an intersection;
identifying external nodes in the dependency graph that do not depend on the other nodes and that have been previously calculated;
analyzing each of the external nodes to determine whether each has the characteristic; and
determining whether the output node of the dependency graph has the characteristic, wherein the output node has the characteristic only if all of the external nodes in the dependency graph also have the characteristic.

2. The media of claim 1, wherein the characteristic is one or more of uniformity, always initialized, or integral float.

3. The media of claim 1, wherein the dependency graph is generated from code that is used for a pixel shader program.

4. The media of claim 1, wherein the dependency graph is generated from programs that include parallel execution.

5. The media of claim 1, wherein the dependency graph includes looping flow control.

6. The media of claim 5, wherein any of the nodes inside of a loop are internal nodes and are ignored while determining whether the output node of the dependency graph has the characteristic.

7. The media of claim 1, wherein one of the external nodes is a shared value that is being used by multiple instances of a program.

8. The media of claim 7, wherein the shared value is capable of being modified.

9. The media of claim 1, wherein one of the external nodes is a value that is stored in a read/write buffer such that it is capable of being modified.

10. The media of claim 1, wherein the dependency graph includes a barrier operation.

11. The media of claim 1, further comprising based on whether the output node has the characteristic, determining whether code associated with the dependency graph can be safely executed in a parallel environment.

12. One or more tangible computer storage media having computer-executable instructions embodied thereon, that when executed, cause a computing device to perform a method for determining whether an output node in a dependency graph has a characteristic based on a plurality of characteristics of one or more input nodes, the method comprising:
generating the dependency graph for the characteristic from the plurality of characteristics, that has a plurality of nodes and that illustrates dependency of each node in relation to other nodes to determine whether the output node has the characteristic, wherein the nodes represent one or more of a value, a condition, or a tree structure;
determining that an operation associated with the characteristic is a union;
determining whether the output node of the dependency graph has the characteristic, wherein the determining includes,
(1) identifying external nodes in the dependency graph that do not depend on the other nodes, and
(2) analyzing each of the external nodes to determine whether each has the characteristic, wherein the output node has the characteristic if one or more of the external nodes in the dependency graph have the characteristic.

13. The media of claim 12, wherein the characteristic is one or more of from unordered access view, not a number possible, infinity possible, or ranges/partial data.

14. The media of claim 12, wherein the nodes that are not identified as the external nodes are internal nodes that do not affect the characteristic.

15. The media of claim 12, further comprising ignoring all of the nodes that are not identified as the external nodes.

16. The media of claim 12, wherein it is determined whether the output node has the characteristic to determine whether code associated with the dependency graph can be parallelized and simultaneously run on more than one computer.

17. The media of claim 16, wherein the code is associated with a pixel shader program.

18. One or more tangible computer storage media having computer-executable instructions embodied thereon, that when executed, cause a computing device to perform a method for determining whether an output node in a dependency graph has a characteristic based on a plurality of characteristics of one or more input nodes, the method comprising:

generating a normal dependency graph that represents code corresponding to a computer graphics program, wherein the normal dependency graph comprises a plurality of nodes, wherein the plurality of nodes are identified as internal nodes or external nodes, and wherein at least one of the nodes represents a shared value or a value stored in a readable/writable buffer;

based on the normal dependency graph, generating a characteristic-specific dependency graph that is used to determine whether the output node has the characteristic from the plurality of characteristics;

identifying which of the plurality of nodes are the internal nodes by determining which of the plurality of nodes depend strictly on other values;

analyzing each of the external nodes, which have not been determined to depend strictly on the other values, to determine whether they have the characteristic, wherein the external nodes have been previously calculated;

determining a merging operation associated with the characteristic, wherein the merging operation is a union or an intersection; and merging all data in the external nodes to determine whether the output node has the characteristic, wherein, (1) if the merging operation is a union operation, then the output node has the characteristic if one or more of the external nodes have the characteristic, and (2) if the merging operation is an intersection operation, then the output node has the characteristic only if all of the external nodes have the characteristic.

19. The media of claim 18, wherein the internal nodes are ignored when determining whether the output node has the characteristic.

20. The media of claim 18, wherein uniformity, always initialized, and integral float characteristics are associated with the intersection operation, and unordered access view, not a number possible, infinity possible, and ranges/partial data are associated with the union operation.

* * * * *